(12) United States Patent
Heijman et al.

(10) Patent No.: US 11,968,996 B2
(45) Date of Patent: Apr. 30, 2024

(54) AROMA-RETAINING SOLUBLE COFFEE

(71) Applicant: Koninklijke Douwe Egberts B.V., Utrecht (NL)

(72) Inventors: Gertjan Heijman, Utrecht (NL); Petrus Maria Theresia de Kok, Utrecht (NL); Alexander Oosterveld, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 585 days.

(21) Appl. No.: 15/851,313

(22) Filed: Dec. 21, 2017

(65) Prior Publication Data
US 2018/0177206 A1 Jun. 28, 2018

Related U.S. Application Data

(63) Continuation of application No. PCT/NL2016/050445, filed on Jun. 23, 2016.

(30) Foreign Application Priority Data

Jun. 23, 2015 (EP) ..................................... 15173428

(51) Int. Cl.
| | |
|---|---|
| A23F 5/48 | (2006.01) |
| A23F 5/36 | (2006.01) |
| A23F 5/46 | (2006.01) |

(52) U.S. Cl.
CPC .................. A23F 5/48 (2013.01); A23F 5/36 (2013.01); A23F 5/46 (2013.01)

(58) Field of Classification Search
CPC .................. A23F 5/36; A23F 5/46; A23F 5/48
(Continued)

(56) References Cited

U.S. PATENT DOCUMENTS

| | | | |
|---|---|---|---|
| 1,836,931 | A | 12/1931 | Meyers et al. |
| 3,769,032 | A | 10/1973 | Lubsen et al. |
| | | (Continued) | |

FOREIGN PATENT DOCUMENTS

| | | | | |
|---|---|---|---|---|
| EP | 0028043 A1 | * | 5/1981 | ............. A23F 5/486 |
| EP | 0 139 849 A1 | | 5/1985 | |
| | (Continued) | | | |

OTHER PUBLICATIONS

International Search Report and Written Opinion, PCT/NL2016/050445, Koninklijke Douwe Egberts B.V., 12 pages (dated Oct. 18, 2016).

(Continued)

*Primary Examiner* — Lien T Tran
*Assistant Examiner* — Tynesha L McClain
(74) *Attorney, Agent, or Firm* — Foley & Lardner LLP (57) ABSTRACT

Disclosed is a process for the production of aromatized soluble coffee particles. The process comprises the incubation of an aroma donor, such as a roasted coffee, with a acceptor, such as a refined coffee oil. The acceptor can be added prior or after incubation to the soluble coffee particles. The disclosure of the present technology also pertains to a process for the preparation of an instant coffee product comprising aromatized soluble coffee particles. Thereby an odor-acceptable edible oil is subjected to aroma transfer from roast coffee beans, either before or after being applied on soluble coffee particles. The aroma transfer being conducted for an incubation time of at least one day, and the amount of the aromatized oil in the instant coffee is 0.8 wt. % to 4.5 wt. %.

30 Claims, 1 Drawing Sheet

(58) Field of Classification Search
USPC .......................................................... 426/594
See application file for complete search history.

(56) References Cited

U.S. PATENT DOCUMENTS

| | | |
|---|---|---|
| 3,823,241 A | 7/1974 | Patel et al. |
| 2012/0073449 A1 | 3/2012 | Volonte et al. |

FOREIGN PATENT DOCUMENTS

| | | | |
|---|---|---|---|
| EP | 0 144 785 B1 | 7/1988 | |
| EP | 0 352 842 A1 | 1/1990 | |
| EP | 0 560 609 A1 | 9/1993 | |
| EP | 2 625 962 B1 | 6/2017 | |
| WO | WO-2007/043873 A1 | 4/2007 | |
| WO | WO-2009007246 A2 * | 1/2009 | ............ A23L 27/115 |
| WO | WO-2014/083422 A2 | 6/2014 | |
| WO | WO-2015/099531 A1 | 7/2015 | |

OTHER PUBLICATIONS

Zeng Fankui and Ou Shiyi-Guangzhou; Coffee Flavor Chemistry; Jinan University Press Oct. 2014.

* cited by examiner

AROMA-RETAINING SOLUBLE COFFEE

CROSS-REFERENCE TO RELATED APPLICATIONS

This application is a continuation of International Application No. PCT/NL2016/050445 filed on Jun. 23, 2016, which claims priority to European Application No. EP 15173428.2 filed Jun. 23, 2015, the entire contents of all of which are incorporated herein by reference in their entireties.

BACKGROUND

The present technology pertains to making aromatized soluble coffee particles, and to an instant coffee comprising aromatized soluble coffee particles.

Coffee is a well-known drink, generally prepared by extraction with hot water of roast and ground coffee beans. A widespread form of coffee, is that of instant coffee. Therein the extracted coffee is turned into soluble particles (typically by spray-drying or freeze-drying). These particles can be reconstituted into liquid coffee, generally by dissolving a recommended amount of the particles in hot water.

An ongoing challenge in making soluble coffee particles, is to provide such particles that, upon dissolution in hot water, will result in a liquid coffee that resembles freshly extracted coffee as much as possible. This has been an issue for coffee producers all over the world as of the coming into existence of soluble coffee. Yet, the general consumer will be familiar with the perception, when smelling and tasting the liquid resulting from dissolving soluble coffee particles in hot water, that said liquid cannot favorably compare to freshly made coffee.

The foregoing issue has been attempted to be resolved by various improvements in the process of extracting coffee, and concentrating coffee extracts, for use in making soluble coffee particles. A particularly useful process, e.g., is that disclosed in WO 2007/043873, which results in better aromas.

A particular desire in providing an instant coffee resides in making soluble coffee particles that generate a smell that is comparable to that of freshly roasted coffee. A method for the aromatizing of instant coffee is disclosed in EP 0 144 785. Herein volatile aromas from roast and ground coffee are transferred to instant coffee by heating, whilst the roast and ground coffee is out of contact with the instant coffee. Such a heating step is less desired from a process economy point of view, as it requires energy for heating. Also, it requires installing equipment not normally present in coffee production, to allow evaporated aromas from the roast and ground coffee to be transferred to the soluble coffee particles. In EP 0 144 785 it is further disclosed to add an amount of an oily substance, such as coffee oil, to the instant coffee. This is suggested in order to improve the retention of aroma.

Another background reference relating to the addition of coffee oil to soluble coffee particles is WO 2014/083422. Herein water is subsequently added to the soluble coffee, in order to unlock the aromatic profile of the coffee oils.

In the art a difficulty remains to provide soluble coffee particles with a sufficiently high level of aroma, and particularly of the aroma component 2-methylpyrazine. It is thus desired to provide a method capable of achieving this, and particularly a method that can be easily implemented in existing facilities for the production of instant coffee.

SUMMARY

In order to better address one or more of the foregoing desires the disclosure of the present technology, in one aspect, presents a process for the preparation of an instant coffee product comprising aromatized soluble coffee particles, the process comprising (a) providing soluble coffee particles; (b) providing an odor-acceptable edible oil; (c) applying the oil on the soluble coffee particles, wherein the oil is subjected to aroma transfer from roast coffee beans, so as to obtain soluble coffee particles comprising aromatized oil, the aroma transfer being conducted for an incubation time of at least one day, and wherein the amount of the aromatized oil in the instant coffee is 0.8 wt. % to 4.5 wt. %.

In another aspect, the present technology provides a process for the preparation of aromatized soluble coffee particles comprising 2-methylpyrazine as a coffee aroma, said 2-methylpyrazine being transferred to the soluble coffee particles by a method comprising aromatizing an odor-acceptable edible oil and applying the oil on the soluble coffee particles in an amount of 0.8 wt. % to 4.5 wt. %; wherein the oil is subjected to aroma transfer from roast coffee beans.

In yet another aspect, the present technology resides in aromatized soluble coffee particles obtainable by a process as identified in the preceding paragraphs, wherein the oil is refined coffee oil.

In a further aspect, the present technology provides a use of roast whole coffee beans for aromatizing an odor-acceptable edible oil, preferably coffee oil, by allowing the oil and the coffee beans to stand in an aroma-transfer environment for a period of at least one day.

DETAILED DESCRIPTION

In a broad sense, the present technology is based on the judicious insight to aromatize coffee oil (or another odor-acceptable edible oil) rather than soluble coffee particles themselves, and to apply such oil on the coffee particles.

It is noted that in the aforementioned EP144785, an embodiment is described wherein coffee oil is sprayed onto soluble coffee particles, and then subjected to aroma transfer from roast and ground coffee beans. The oil level taught herein is relatively low, viz. 0.7% by weight. This is reflected in the purpose of the oil, which serves to aid the retention of the aroma. In EP144785 it is not taught to aromatize the oil.

In the present technology, the oil is expressly the acceptor vehicle for the aroma transfer. The oil is applied onto the soluble coffee particles either before or after aromatization. The amount of oil thereby is at least 0.8 wt. %, and preferably higher, up to 4.5 wt. %. The amount of oil preferably is in a range of from 1 wt. % to 2.5 wt. %, and more preferably of from 1 wt. % to 1.5 wt. %. A particularly preferred amount of oil is about 1.25 wt. %. The foregoing ranges preferably hold for oil as such. The oil hereby preferably is refined oil, more preferably refined coffee oil. In the event that the oil is provided as an emulsion in water, the oil is preferably applied in a range of from 1 wt. % to 3 wt. %, more preferably of from 1.25 wt. % to 2 wt. %. A particularly preferred amount of oil provided by such an emulsion is about 1.5 wt. %. The oil hereby preferably is refined oil, more preferably refined coffee oil.

According to an embodiment, an instant coffee product is produced comprising soluble coffee particles treated according to the present technology, and untreated soluble coffee particles. The instant coffee product comprises a desirable amount of 0.8 wt. % to 4.5 wt. % oil. The amount of the aromatized oil present on the soluble coffee particles will be proportionally higher. E.g., in the event that the ratio of treated soluble coffee to untreated soluble coffee in the instant coffee product is 1:4, the amount of oil applied can be five times as high as the amounts and preferred amounts mentioned above, so as to provide a desirable amount within a range of from 0.8 wt. % to 4.5 wt. % oil in the instant coffee product.

In another embodiment, the instant coffee product consists essentially of only aromatized soluble coffee particles. In that event, the soluble coffee particles are aromatized by a process as described hereinbefore or hereinafter, with the amount of oil applied on the soluble coffee particles being in accordance with the amounts in a range of from 0.8 wt. % to 4.5 wt. %, and preferred amounts as mentioned above.

The soluble coffee particles of the present technology, and the instant coffee of the present technology comprising said particles, are indicated as being aromatized (which is a result of the method of the present technology). Similarly, they are also indicated as being aroma-retaining, as the method of the present technology surprisingly results not only in a favorable addition of aroma, but also in a favorable retention of such aroma. The aroma addition and retention of the soluble coffee particles of the present technology extend to instant coffee comprising these particles.

The term "instant coffee" refers to a product comprising soluble coffee particles, from which coffee in the form of a liquid drink can be made by reconstitution with hot water. In an interesting embodiment, the instant coffee comprises a small quantity of roast and ground coffee beans (i.e., insoluble coffee particles) in addition to the soluble coffee particles. In another interesting embodiment, the instant coffee consists essentially of soluble coffee particles and roast and ground coffee. In still another interesting embodiment, the instant coffee consists of soluble coffee particles. The instant product may consist of 100% aroma-retaining soluble coffee particles according to the present technology. It may also comprise a combination of soluble coffee particles according to the present technology (such as soluble coffee particles treated by the aromatization method of the present technology or otherwise treated so as to have the characteristics of soluble coffee particles obtainable by the method of the present technology), and soluble coffee particles not according to the present technology (such as untreated soluble coffee particles). For example, the instant product may comprise 90%-10% treated and 10-90% untreated soluble coffee particles, more preferably 80-50% treated and 20-50% untreated. However, most preferred is that all of the instant coffee product has been treated.

In accordance with existing practice in the art, the instant coffee according to the present technology may comprise roast and ground coffee beans. If present, the amount thereof will generally not exceed 5 wt. %, and will preferably be lower, as discussed below.

For completeness' sake it is added that, in connection with instant coffee, it will be understood that the terms "soluble" and "insoluble" refer to solubility in water. It will be understood that roast and ground coffee beans are not soluble in liquid water at atmospheric pressure, whether hot or cold. Soluble coffee particles are soluble in liquid water, whereby the dissolution rate is affected by the temperature, but not the solubility as such.

Further in a broad sense, the present technology refers to these soluble coffee particles with such an unexpected advancement in respect of aroma due to certain constituent characteristic, such as the presence of marker compounds and the absence of compounds which impair the aroma and/or appropriate reconstitution supporting the aroma.

The incubation time refers to the period during which the oil and the roast (whole or ground) coffee beans are kept in an aroma-transfer environment. The incubation time is at least one day, and preferably at least three days. The incubation time can be as long as desired, but preferably does not exceed one month and, more preferably, does not exceed two weeks. Most preferably, the incubation time is at most one week.

In the event the oil is subjected to aromatization prior to being applied onto the soluble coffee particles, the incubation time is preferably two to five days.

In the event the oil is subjected to aromatization after having been applied onto the soluble coffee particles, the incubation time is preferably three to six days.

The temperature at which the coffee beans are held during incubation generally is below 50° C., and preferably below 30° C. Temperatures as high as those used in EP144785, such as 87° C., are most preferably avoided. It is preferred that the temperature is in a range running from above 0° C. to 50° C., preferably from 4° C. to 25° C. Most preferably, room temperature (18° C. to 25° C., preferably 20° C. to 23° C.) is applied. The temperature of the soluble coffee particles is preferably in the same ranges as the temperature of the coffee beans, and preferably in a lower end thereof, such as 0° C. to 10° C., preferably 4° C. to 6° C.

The aroma transfer of the present technology can be conducted by applying a broad range of ratios of aroma donor (roast coffee beans) to acceptor (oil as such or as applied on soluble coffee particles). In the event that the oil is applied on the soluble coffee particles prior to conducting the aroma transfer, the ratio of the roast coffee beans to the soluble coffee particles comprising applied oil, is preferably in a range of from 5:1 to 1:5, and more preferably of from 3:1 to 1:3, on a weight basis. Still more preferably, this ratio is 2:1 to 1:2, and most preferably 1:1.

In the event that the oil is subjected to the aroma transfer prior to applying the oil on the soluble coffee particles, the ratio of the roast coffee beans to the oil is preferably in a range of from 100:10 to 100:0.1, and more preferably of from 100:5 to 100:1, on a weight basis.

Without wishing to be bound by theory, the inventors believe that temperatures of below 50° C., and preferably below 30° C., have a beneficial effect on aroma. At elevated temperatures the partition coefficient between the oil phase and the gas phase will change, and will be different for each aroma compound. As a result, the aroma profile after the aroma transfer above the particles will not mirror the flavor profile of a roasted coffee bean at room temperature. Further, at elevated temperatures such as those applied in EP144785, staling of the oil and reactions of the coffee aroma compounds without external factors such as oxygen, stainless steel, phenols, will speed up considerably.

The present technology is based on providing an aroma-transfer environment wherein both the oil and roast coffee beans are present. Thereby the environment is preferably set-up in such a way that the coffee beans and the oil cannot come into physical contact with each other. The latter would result in the presence of a difficult-to-control additional amount of oil and, moreover, to a different aroma profile due to extraction by the oil.

In an interesting embodiment, the oil is subjected to aromatization prior to being applied onto the soluble coffee particles. Thereby roast coffee beans, preferably whole beans, are provided in an aroma-tight environment, such as a chamber, a jar, a vessel, or any other type of container. The walls enclosing the environment are preferably of coated steel, such as glassified or silonated steel, in order to avoid oxidation by the steel. Silonated steel refers to steel provided with an inert silicon-based coating. Such coatings are, e.g., made by vapor deposition of silica. Commercially available coatings are, e.g., SilcoNert® coatings (SilcoTek) or Silonite® coating (Entech).

Within this environment, the oil is provided in a separate holding device. Said holding device is capable of being in an aroma-transfer contact with the environment in which the beans are present. E.g., the holding device can be an open dish, or closed device provided with perforations, holes, or other openings allowing the oil headspace to exchange with the environment in which the beans are present. It is also conceivable to have the beans and the oil in separate vessels, and to provide an airflow connection from the beans to the oil. Such a connection can be a forced convection driven by, e.g., a fan or a blower.

The resulting aromatized oil can be applied onto soluble coffee particles by spraying, pipetting, or other suitable techniques to coat a layer of an oily liquid onto particles. It will be understood that, since the oil is already aromatized, the process of application is preferably conducted in an environment from which aroma cannot easily be lost. In an interesting embodiment, the application is conducted in a vacuum (i.e., at a reduced pressure, preferably as low as normally technically conceivable). In another interesting embodiment, the application is conducted in an environment of so-called bean gas. This gas (largely carbon dioxide) forms in coffee beans during the roasting process as a natural byproduct of coffee roasting. Since this gas inevitably also carries volatile aromas, the bean gas environment serves to better secure an aroma-retaining equilibrium between the oil when being applied, and the atmosphere around it.

In another interesting embodiment, the oil is subjected to aromatization after having been applied onto the soluble coffee particles.

This application can be done with the same methods as for the aromatized oil but preferably with a tumbler mixer with an axially mounted nozzle for homogeneous distribution of the oil. Thereby both the roast coffee beans and the oil-coated soluble coffee particles are provided in an aroma-transfer environment. This can be a single vessel having separate chambers, with an airflow connection (e.g., as perforations) between the two. E.g., beans are held on the bottom of a vessel, and soluble coffee particles comprising the oil are held in a sieve placed in the same vessel. It is also conceivable to have the beans and the soluble coffee particles, with oil, in separate vessels, and to provide an airflow connection from the beans to the oil. Such a connection can be driven by, e.g., a fan or a blower.

Figure 1:
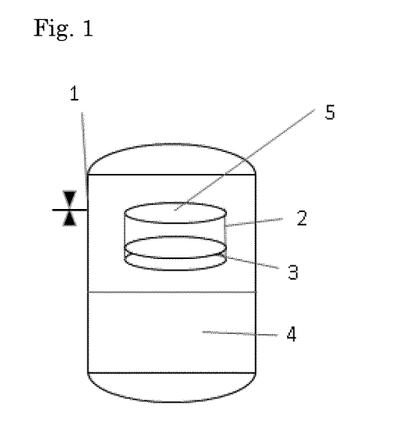
FIG. 1 is a schematic representation of a single-vessel system for the incubation of oil, such as coffee oil, the oil optionally being present on soluble coffee particles, with aroma from roast coffee beans.
Figure 2:
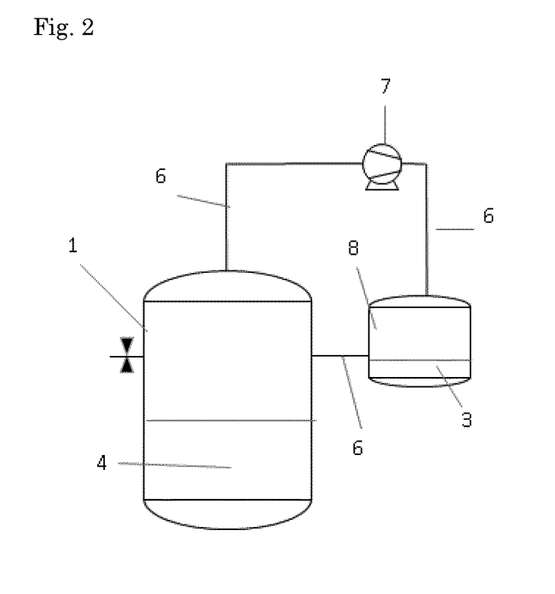
FIG. 2 is a schematic representation of a two-vessel system for the incubation of oil, such as coffee oil, the oil optionally being present on soluble coffee particles, with aroma from roast coffee beans.

Two embodiments are schematically shown in FIG. 1 and FIG. 2, to which the following legend applies:
1. Aroma donor vessel containing a gas valve
2. Incubation vessel
3. Oil (optionally on soluble coffee particles)
4. Roast coffee beans
5. Open connection (e.g. perforations) to the aroma donor vessel.
6. Aroma-gas circulation line
7. Blower
8. Closed-off incubation vessel In FIG. 1 a schematic representation is given of a first embodiment of the present technology. Depicted is a system for the incubation of oil, such as coffee oil, with aroma from roast coffee beans. The roast coffee beans (4), preferably whole beans, are held in an aroma donor vessel (1). Within the closed-off environment of this vessel, an incubation vessel (2) is held. The incubation vessel (2) contains oil to be aromatized, such as coffee oil, preferably refined coffee oil. The oil can be oil as such, or oil can be applied on soluble coffee particles prior to aromatization. The incubation vessel in this embodiment has an open connection (5) to the aroma donor vessel. During an incubation time in accordance with the present technology, aroma from the roast coffee beans (4) is capable of aromatizing the oil (3) contained in the incubation vessel (2). Since the incubation vessel is contained within the closed-off environment of the aroma donor vessel, and the incubation vessel has an open connection (5) to said aroma donor vessel, this embodiment is designated to be a "single vessel" system.

In FIG. 2 a schematic representation is given of a second embodiment of the present technology. Depicted is a system for the incubation of oil, such as coffee oil, with aroma from roast coffee beans. The roast coffee beans (4), preferably whole beans, are held in an aroma donor vessel (1). The system comprises a separate, closed-off incubation vessel (8). The incubation vessel (8) contains oil to be aromatized, such as coffee oil, preferably refined coffee oil. The oil can be oil as such, or it oil applied on soluble coffee particles. The incubation vessel and the aroma donor vessel in this embodiment are connected by gas flow lines which together provide an aroma-gas circulation line (6). Optionally, but preferably, this circulation line comprises blower (7) serving to generate a forced convection from the aroma donor vessel to the incubation vessel. During an incubation time in accordance with the present technology, aroma from the roast coffee beans (4) is forced to pass to the incubation vessel (8) in order to aromatize the oil (3) contained in the incubation vessel (8). Since the incubation vessel is closed off, but for the aroma-gas circulation line, this embodiment is designated to be a "two-vessel" system. Optionally, the vessel is subjected to evacuation (creating a vacuum) in order to have as low an amount of oxygen present as possible, and to facilitate diffusion of the beans to the headspace.

A further option, to still better secure low oxygen levels, is to flush the vessel with an inert gas such as nitrogen. The oil can be any odor-acceptable edible oil. The term "odor-acceptable" refers to either a neutral odor, or a coffee odor. Preferred are oils that naturally occur in coffee, such as coffee oil or coffee oil fractions. Other oils from non-coffee sources, preferably vegetable oils, may also be employed provided that they are neutral in aroma and taste. Examples of suitable substances include corn oil, coconut oil, soybean oil, sunflower oil, *arachis* (peanut) oil, and the like. Preferably the oil does not affect solubility and has a storage life which is at least equal to that of the instant coffee product.

More preferably, the oil is refined oil. For all of the suitable edible oils, preferably vegetable oils, this has a benefit of resulting in a desirable neutral odor and taste. In a particularly preferred embodiment, the oil is refined coffee oil. Such oil has an advantageously low content of kahweol and cafestol.

In an interesting embodiment, the present technology also pertains to aromatized soluble coffee particles comprising coffee oil, characterized by having a content of cafestol of at most 15 g of cafestol per kg of oil. Particularly, the coffee oil herein is refined coffee oil. The cafestol content can be as low as zero, or close to zero, in the event that bleaching has resulted in removing all cafestol from the oil. More typically, the cafestol level is between 50 mg/kg and 1 g/kg oil.

In another interesting embodiment, the present technology also pertains to aromatized soluble coffee particles comprising coffee oil, characterized by having a content of kahweol of at most 10 g of kahweol per kg of oil. Particularly, the coffee oil herein is refined coffee oil. The kahweol content can be as low as zero, or close to zero, in the event that bleaching has resulted in removing all kahweol from the oil. More typically, the kahweol level is between 50 mg/kg and 1 g/kg oil.

Preferably, the aromatized soluble coffee particles of the present technology satisfy the aforementioned contents of both cafestol and kahweol. For the determination of the amounts of cafestol and kahweol, reference is made to Braz. J. Plant Physiol. vol. 18 no. 1 Londrina January/March 2006.

The refining of oils, and specifically also of edible oils, more specifically of vegetable oils, is known to the skilled person. The refining of the edible oils, such as coffee oil, for use in the present technology, generally comprises two refining stages, namely bleaching and deodorization. The bleaching step may involve, or be preceded by, degumming. This refers to separating the gum and fatty acid in the crude oil together with other impurities such as trace minerals, copper and iron. This is typically by the application of an acid, usually phosphoric acid, citric acid or malic acid. Other acids sometimes referred to are, e.g., acetic acid, oxalic acid, boric acid. Combinations of such acids, e.g., citric acid and phosphoric acid, can also be used.

In bleaching, the oil is mixed with bleaching earth (such as bentonite calcium), typically in a vacuum room to remove impurities and color pigments in the oil. The bleaching of edible oils and fats is a part of the refining process of crude oils and fats, which removes contaminants that adversely impact the appearance and performance of these triglyceride (triacylglycerol)-based materials. Preceded generally by degumming and refining (neutralization) processes, bleaching is required to remove specific detrimental contaminants that are not effectively removed by these processes before the oil progresses through deodorization. Generally by a process of mixing the oil and a clay adsorbent to remove color, the bleaching operation effectively removes some of the color, reduces the contents of chlorophyll, residual soap and gums, trace metals, oxidation products, and indirectly impacts on deodorized oil color.

Mostly two types of bleaching clays are used in processing edible oils, including coffee oil. These are characterized as "Natural Bleaching Earth" and "Activated Bleaching Earth." The former is typically a bentonite clay exhibiting adsorptive properties in its native state. Activated bleaching earth can be produced from bentonite clay, typically from a type that contains a relatively high proportion of montmorillonite.

Bleaching clays are activated to varying degrees via interaction with acids ranging from completely natural clays to highly acid-treated clays.

Deodorization is typically a stripping process in which a given amount of a stripping agent (usually steam) is passed for a given period of time through hot oil at a low pressure. It is usually carried out at high temperature (>200° C.), followed by cooling to room temperature. Preferred temperatures are between 220° C. and 280° C., e.g., 240° C. to 260° C.

In an interesting embodiment, the oil is provided in the form of an emulsion in water. Thereby the oil percentage is generally at most 50 wt. %, preferably lower, such as from 15 wt. % to 45 wt. %, more preferably about 40 wt. %. This embodiment has a particular advantage for the purpose of applying the oil on the soluble coffee particles. The water (i.e., the continuous phase of the emulsion used) thereby effectively functions as a carrier liquid to transfer the aromatized oil to the soluble coffee particles. Applying oil as such, runs a risk of leading to bulk droplets of oil appearing on the soluble coffee particles. By applying the oil in the form of an emulsion, the oil becomes more equally distributed. Without wishing to be bound by theory, the inventors believe that this is the result of water easily penetrating into the soluble coffee particles. Preferably, the emulsion comprises an emulsifier, typically in an amount of 0.5 wt. % to 15 wt. %, preferably 1 wt. % to 10 wt. %, more preferably 2.5 wt. % to 7.5 wt. %. Suitable emulsifiers, as used in many edible emulsion products, are known to the skilled person, e.g., polyethoxylated sorbitan esters such as Tween™ in various grades. Preferably, in the present technology a coffee-related emulsifier is used, more preferably originating from coffee itself. Surprisingly, it was found that soluble coffee particles work well as an emulsifier. To this end, in a preferred embodiment, of from 1 wt. % to 10 wt. %, preferably 2.5 wt. % to 7.5 wt. %, more preferably 4 wt. % to 6 wt. % of soluble coffee particles are dissolved in the water from which the aforementioned oil in water emulsion is made.

The application of the oil in the form of an emulsion is particularly of additional benefit in the event that the oil is first aromatized and then applied onto the soluble coffee particles. For a challenge is to reduce, and preferably avoid, loss of aroma from the aromatized oil as a result of the process of applying the oil onto the soluble coffee particles.

The roast coffee beans can be whole or ground, but whole beans are preferred. Preferably the roast coffee consists essentially of such roast whole beans. I.e., whilst it would not be practical to exclude presence of the occasional broken bean, as one or more beans might always accidentally become broken, the preference of the present technology to use roast coffee in the form of whole beans. Residual broken beans, fragments or other associated particulate bean matter which has previously been roasted and which is not soluble, is subsumed as roast and ground coffee beans in the context of the present technology. If such roast and ground coffee beans are present in the final product, i.e. the instant coffee comprising the aromatized soluble coffee particles, an insoluble residue might remain after reconstitution which is both unpleasant for the consumer and gives an off-taste in the final brew. Without wishing to be bound by theory, the inventors believe that over-extraction of the insoluble residue might causes this perceived off-taste. Hence, the instant coffee according to the present technology comprises such roast and ground coffee beans in an amount not exceeding 5 wt. %. Preferably this amount will not exceed 3 wt. %, more preferably it will not exceed 1 wt. %, and still more preferably it will be at most 0.5 wt. %. Most preferably the amount is below the detection threshold. Hence, the absence of such roast and ground coffee beans in the present instant coffee is preferred.

Without wishing to be bound by theory, the inventors believe that the type of aromas (essentially only volatiles) generated from whole beans, is better suited for providing soluble coffee with a sustainable aroma, than the type of aromas that is transferred, particularly with oil, from roast and ground coffee beans. Also, the process of the present technology results in a more favorable ratio of aroma to oil, as evidenced with reference to 2-methylpyrazine. In this regard, the process of the present technology results in soluble coffee particles that provide instant coffee with an amount of oil of 0.8 to 4.5%, preferably 1.0 to 2.5%. It is surprising that such particles with the specified characteristics, which decisively contribute to the addition and retention of the aroma of the instant coffee, are obtained by the claimed process.

The instant coffee comprising the soluble coffee particles in accordance with the present technology, has another remarkable advantage. This relates to the retention of aroma during so-called open shelf-life. Obviously, in the practical use of instant coffee, a container (e.g., a glass jar) will be opened by a consumer, and then used for some time (days or weeks) until the container is empty. After the first time opening, the shelf-life of the product is further referred to as "open shelf life." It is well known that coffee aromas will more quickly be reduced once the open shelf life has commenced. An advantage of the instant coffee according to the present technology is that it shows a better retention of aroma, particularly as evidenced in respect of 2-methyl pyrazine, also during open shelf-life.

The roast whole coffee beans are preferably roasted shortly before use. In general, once roasted the beans will be kept no longer than one month before being mixed with soluble coffee particles, preferably less than a week, more preferably less than a day.

The coffee beans used can be of any type. The main coffee species used are *Arabica* beans and *Robusta* beans. Typically, mixtures of both can be used. These beans can be recognized as having a specified geographical origin, such as Brazil, Colombia, or Indonesia. The soluble coffee particles can be made by extraction from roast and ground coffee beans of any type. The soluble coffee particles can be produced from decaffeinated beans.

In an interesting embodiment, the soluble coffee particles are made by extraction from roast and ground coffee beans that, before grinding, have been used in the method of the present technology, to impart coffee aroma to a previously produced batch of soluble coffee particles.

The soluble coffee particles can be provided off the shelf, and then subjected to the process of the present technology. Preferably, however, the present technology is realized in a coffee production plant that produces both the soluble coffee particles and the roast whole coffee beans.

The soluble coffee particles can be obtained from a liquid coffee extract by any concentration technique by which water is removed from said extract, particularly a coffee concentrate. These techniques generally are, e.g., freeze concentration, evaporation, or nanofiltration. This includes spray drying, drum drying, freeze drying, or extrusion. The dried soluble coffee particles generally have a residual moisture content in the range of from 1 wt. % to 5 wt. %, preferably 2 wt. % to 4%, most preferably about 3.5%.

In addition to the specific step of the present technology according to which the soluble coffee particles are aromatized, any other techniques available to the skilled person can be applied in order to add aromas to the soluble coffee particles. E.g., in making soluble coffee particles, it is possible to apply process streams by which aromas are obtained from coffee beans and/or from a coffee extract, and recirculate these aromas to the soluble coffee particles.

A preferred process comprises producing a dried (particularly spray-dried or freeze-dried) coffee concentrate, wherein the concentrate is produced in accordance with the teaching in WO 2007/043873 or EP-A-0 352 842.

The specific surface area of conventionally produced soluble coffee particles is generally in the range of 0.1 to 0.3 $m^2/gm$. In an interesting embodiment, soluble coffee particles having a microporous structure may be used to promote adsorption of the aromas from the roast whole coffee beans.

In a preferred embodiment of the present technology, in all its aspects, the soluble coffee particles are obtained via freeze-drying.

The coffee employed as a source for the extract from which the soluble coffee particles are made, as well as the whole roast coffee beans employed to impart aroma onto the soluble coffee particles, can be of the same or of a different roast. In connection with the embodiment wherein the whole roast beans, after being used for aroma generation according to the present technology, are thereafter used for extraction, all coffee used is preferably of the same roast.

The method of the present technology, as substantially described hereinbefore, is particularly suitable for aromatizing soluble coffee particles with coffee aromas such that a detectable quantity of 2-methylpyrazine is present. Although 2-methylpyrazine is not the only aroma provided to the soluble coffee particles, it is believed to be a characteristic coffee aroma for fresh coffees that are appealable to the consumer.

In connection herewith, it is important that the actual content of 2-methylpyrazine in the soluble coffee particles has a significant impact on the aroma of the instant coffee. As it is commonly known in the art, aroma refers to chemical compounds that have a smell or odor, and thus affect both the sense of taste and smell. Hence, in the context of the present technology, an aroma is a chemical compound which has a smell or odor because it is sufficiently volatile to be transported to the olfactory system in the upper part of the nose. Generally molecules meeting this specification have molecular weights of below 300. In particular, 2-methylpyrazine is such a volatile compound. It is generally accepted in the art to quantify such a compound in the headspace, i.e., the gaseous constituents of a closed space above liquids or solid emitting and vapors measured using headspace chromatography. Accordingly, the equilibrated headspace of the soluble coffee particles is measured which comprises at least 1.5 ng per ml headspace of 2-methylpyrazine, preferably at least 1.70 ng per ml headspace of 2-methylpyrazine, and most preferably at least 2.5 ng per ml headspace of 2-methylpyrazine.

Hence, the present technology also concerns a product, i.e., the instant coffee comprising the soluble coffee particles as described herein, wherein the oil is refined coffee oil. These particles are in particular characterized by their surprisingly high content in 2-methylpyrazine of at least 1.5 ng per ml headspace of 2-methylpyrazine, preferably at least 1.7 ng per ml headspace of 2-methylpyrazine, and most preferably at least 2.5 ng per ml headspace of 2-methylpyrazine, the soluble coffee particles further having an amount of oil of 0.8 to 4.5 wt. %, preferably 1.0 to 2.5 wt. %.

It is a further important finding that the so characterized product of the present technology is capable to maintain these characteristics when stored which is representative for maintaining the desired improved aroma of the instant coffee. The product characteristics are maintained at least 3 months after preparation, preferably at least 6 months and even more preferably at least 24 months.

In another aspect, the present technology provides a process for the preparation of aromatized soluble coffee particles comprising 2-methylpyrazine as a coffee aroma, said 2-methylpyrazine being transferred to the soluble coffee particles by a method comprising aromatizing an odor-acceptable edible oil, in any of the embodiments discussed hereinbefore and hereinafter, and applying the oil on the soluble coffee particles in an amount of 0.8 wt. % to 4.5 wt. %; wherein the oil is subjected to aroma transfer from roast coffee beans.

The foregoing embodiments and preferences, such as for incubation time and ratios, equally apply to this process.

In a further aspect, the present technology provides a use of roast whole coffee beans for aromatizing an odor-acceptable edible oil, preferably coffee oil. This refers to allowing the oil and the coffee beans to stand in an a aroma-transfer environment for a period of at least one day, in accordance with any of the embodiments discussed hereinbefore.

The roast whole coffee beans in all of the aspects and embodiments of the present technology can be of a light roast, of a medium roast, or of a dark roast. These terms have a known meaning to the skilled person. Preferably, the whole roast beans are of a dark roast.

While the present technology has been illustrated and described in detail in the drawings and foregoing description, such illustration and description are to be considered illustrative or exemplary and not restrictive; the present technology is not limited to the disclosed embodiments.

For example, it is possible to operate the present technology in an embodiment wherein soluble coffee particles on which coffee oil is applied are subjected to aromatization of the oil according to the present technology, and subsequently another batch of separately aromatized coffee is applied on the already coated particles.

Other variations to the disclosed embodiments can be understood and effected by those skilled in the art in practicing the claimed technology, from a study of the drawings, the disclosure, and the appended claims. In the claims, the word "comprising" does not exclude other elements or steps, and the indefinite article "a" or "an" does not exclude a plurality. The mere fact that certain features of the present technology are recited in mutually different dependent claims does not indicate that a combination of these features cannot be used to advantage. Any reference signs in the claims should not be construed as limiting the scope.

In sum, the present technology relates to a process for the production of aromatized soluble coffee particles. The process comprises the incubation of an aroma donor, such as a roasted coffee, with an acceptor, such as a refined coffee oil. The acceptor can be added prior or after incubation to the soluble coffee particles. The present technology also pertains to a process for the preparation of an instant coffee product comprising aromatized soluble coffee particles. Thereby an odor-acceptable edible oil is subjected to aroma transfer from roast coffee beans, either before or after being applied on soluble coffee particles. The aroma transfer being conducted for an incubation time of at least one day, and the amount of the aromatized oil in the instant coffee is 0.8 wt. % to 4.5 wt. %.

The present technology will be further illustrated with reference to the following, non-limiting examples.

Example 1

A batch of roasted *Arabica* beans was ground and from this ground coffee an extract was obtained according to WO2007/043873. This extract was concentrated and further freeze-dried to obtain soluble coffee particles.

Commercially available coffee oil was refined in order to remove a range of detrimental compounds. Among which are: off-flavors, staling compounds, kahweol, and cafestol. Refining was conducted in a process for vegetable oils as known to skilled persons, and included a bleaching step and a steam distillation step. After refining, an odorless refined coffee oil was obtained that had less than 1 g of kahweol and cafestol per kg of oil.

Example 1a: 275 grams of freshly roasted whole coffee beans were filled in an inert glass vessel of 1.5 liter with a Silonite™ coating. 5.5 grams of refined coffee oil was poured in a petri-dish with a diameter of 5 centimeters. The petri dish was placed in the glass vessel on top of the roasted coffee (see FIG. 1). The vessel was closed and headspace oxygen was removed creating a vacuum, which also facilitates diffusion of the beans to the headspace.

The coffee was allowed to degas until atmospheric pressure. Excess pressure caused by the degassing beans was released twice a day via a manual gas vent. After seven days of incubation the vessel was opened and the resulting aromatic oil was collected. The aromatic oil was then assessed by sensory experts and GC-MS analysis.

Aromatic oil was added to soluble coffee particles by pipetting, and thereafter gently rolling the particles in a glass flask, resulting in a film of aromatic oil covering the particles, thus forming aromatized soluble coffee particles.

The resulting soluble coffee (an instant coffee product wherein all of the soluble coffee particles are the aromatized soluble coffee particles) had 1% w/w of aromatized oil and generated a headspace with a 2-methyl pyrazine level of 2.5 ng/ml headspace. During sensory testing the instant coffee product had a clear roasted coffee smell.

Example 1b: 275 grams of freshly roasted whole coffee beans were filled in an inert glass vessel of 1.5 liter with a Silonite™ coating. 5.5 grams of refined coffee oil was poured in a petri-dish with a diameter of 5 centimeters. The petri dish was placed in the glass vessel on top of the roasted coffee, in accordance with FIG. 1. The vessel was closed and headspace oxygen was removed creating a vacuum.

The coffee was allowed to degas for seven days. After seven days of incubation the pressure caused by the degassing beans reached two bar (a). The vessel was opened and the resulting aromatic oil was collected. The aromatic oil was then assessed by sensory experts and GC-MS analysis.

Of the aromatic oil, an emulsion was made. The emulsion consisted of 45% w/w refined aromatic oil emulsified in 50% w/w water using 5% w/w soluble coffee particles as an emulsifier.

The refined aromatic oil emulsion was added to soluble coffee particles by pipetting, and thereafter gently rolling the particles in a glass flask, resulting in a film of aromatic oil covering the particles, thus forming aromatized soluble coffee particles.

The resulting soluble coffee (an instant coffee product wherein all of the soluble coffee particles are the aromatized soluble coffee particles) had 1% w/w of aromatized oil and generated a headspace with a 2-methyl pyrazine level of 1.7 ng/ml headspace. During sensory testing the instant coffee product had a clear roasted coffee smell.

Example 1c: 400 grams of freshly roasted coffee beans were filled in a stainless steel vessel. 8 grams of refined coffee oil was poured in a second vessel (as depicted in FIG. 2). The two vessels were connected by stainless steel tubing and oxygen levels were reduced by applying first a vacuum followed by flushing the system with nitrogen gas.

The coffee was allowed to degas for two days, during which a flow was generated between the vessels by a blower. After two days of incubation the vessel was opened and the resulting aromatic oil was collected. The aromatic oil was then assessed by sensory experts and GC-MS analysis.

Oil was added to soluble coffee particles by pipetting, and thereafter gently rolling the particles in a glass flask, resulting in a film of aromatic oil covering the particles, thus forming aromatized soluble coffee particles.

The resulting soluble coffee (an instant coffee product wherein all of the soluble coffee particles are the aromatized soluble coffee particles) had 1% w/w of aromatized oil and generated a headspace with a 2-methyl pyrazine level of 2.7 ng/ml headspace. During sensory testing the instant coffee product had a clear roasted coffee smell.

Example 1d: Of the aforementioned refined coffee oil an emulsion was made. The emulsion consisted of 45% w/w refined oil emulsified in 50% w/w water using 5% w/w soluble coffee as an emulsifier. This emulsion was sprayed with a nozzle on soluble coffee particles.

The final oil load in the soluble coffee particles was 1% w/w.

400 gram of freshly roasted coffee beans was filled in a stainless steel vessel.

200 grams of oil rich soluble coffee particles were filled in a second vessel, in accordance with FIG. 2. The two vessels were connected by stainless steel tubing and oxygen levels were reduced by applying first a vacuum followed by flushing the system with nitrogen gas.

The coffee was allowed to degas for two days during which airflow was generated between the vessels by a blower.

After two days of incubation the vessel was opened and the resulting aromatic oil rich soluble coffee particles (aromatized soluble coffee particles) were collected. The aromatic oil rich soluble coffee particles were then assessed by sensory experts and GC-MS analysis.

The resulting soluble coffee (an instant coffee product wherein all of the soluble coffee particles are the aromatized soluble coffee particles) had 1% w/w of oil and generated a headspace with a 2-methyl pyrazine level of 3.3 ng/ml headspace. During sensory testing the instant coffee product had a clear roasted coffee smell.

Example 2

Refined coffee oil was sprayed with a nozzle on soluble coffee particles. The final concentration of oil in soluble coffee particles was 1% w/w. 80 grams of freshly roasted coffee beans were filled in a vessel of 1.5 liter with a Silonite™ coating. 40 grams of oil rich soluble coffee particles were filled in a second vessel which was placed in the first 1.5 liter vessel, in accordance with FIG. 1.

The vessel was closed and headspace oxygen was removed creating a vacuum.

The coffee was allowed to degas, resulting in aroma transfer to the oil-loaded soluble coffee particles during an incubation time as summarized in Table 1 below. After incubation the vessel was opened and the resulting aromatized soluble coffee particles were collected.

The aromatic soluble coffee particles (an instant coffee product wherein all of the soluble coffee particles are the aromatized soluble coffee particles) were then assessed by sensory experts and GC-MS analysis. During sensory testing the instant coffee product had a clear roasted coffee smell. Results are summarized in Table 1.

TABLE 1

| Example | Roast time (minutes) | Incubation time (days) | 2-methl pyrazine (ng/mL HS) | Smell |
|---|---|---|---|---|
| 2a | 5.5 | 1 | 2.85 | (+) |
| 2b | 5.5 | 2 | 3.88 | (+) |
| 2c | 5.5 | 3 | 4.43 | (+) |
| 2d | 5.5 | 4 | 5.43 | (+) |
| 2e | 5.5 | 5 | 4.35 | (+) |
| 2f | 5.5 | 6 | 4.79 | (+) |

Example 3

Refined coffee oil was sprayed with a nozzle on soluble coffee particles. The final concentration of oil in soluble coffee particles was 2% w/w.

400 grams of freshly roasted coffee beans were filled in a stainless steel vessel. 200 grams of oil rich soluble coffee particles were filled in a second vessel, in accordance with FIG. 2. The two vessels were connected by stainless steel tubing and oxygen levels were reduced by applying first a vacuum followed by flushing the system with nitrogen gas.

The coffee was allowed to degas for six days during which airflow was generated between the vessels by a blower.

After six days of incubation the vessel was opened and the resulting aromatic oil rich soluble coffee particles were collected. The aromatic oil rich soluble coffee particles (aromatized soluble coffee particles) were then assessed by sensory experts and GC-MS analysis.

The resulting soluble coffee (an instant coffee product wherein all of the soluble coffee particles are the aromatized soluble coffee particles) had 2% w/w of oil and generated a headspace with a 2-methyl pyrazine level of 3.7 ng/ml headspace. During sensory testing the instant coffee product had a clear roasted coffee smell.

Example 4

275 grams of freshly roasted whole coffee beans were filled in an inert glass vessel of 1.5 liter with a Silonite™ coating. 5.5 grams of refined coffee oil was poured in a petri-dish with a diameter of 5 centimeters. The petri dish was placed in the glass vessel on top of the roasted coffee, as depicted in FIG. 1. The vessel was closed and headspace oxygen was removed by creating a vacuum.

The coffee was allowed to degas until atmospheric pressure. Excess pressure caused by the degassing beans was released twice a day manually with a gas vent. After five days of incubation the vessel was opened and the resulting aromatic oil was collected. The aromatic oil was then assessed by sensory experts and GC-MS analysis.

Oil was added to soluble coffee particle in two ways:

Example 4 a: 100 grams of oil rich soluble coffee particles were filled in a 1.5 L vessel and spread evenly over the bottom of the vessel.

The vessel was closed airtight and oil was added in droplets via an orifice at the top of the vessel during which the vessel was gently shaken to ensure homogeneity. The resulting aromatized soluble coffee particles had 1% w/w of aromatized oil.

The aromatic soluble coffee particles (an instant coffee product wherein all of the soluble coffee particles are the aromatized soluble coffee particles) were then assessed by sensory experts and GC-MS analysis.

During sensory testing the instant coffee product had a clear roasted coffee smell. Results are summarized in Table 2.

Example 4 b: 100 grams of oil rich soluble coffee particles were filled in a 1.5 L vessel and spread evenly over the bottom of the vessel.

The vessel was closed airtight the headspace was removed by vacuum and gas from degassing beans was introduced into the vessel.

Subsequently oil was added in droplets via an orifice at the top of the vessel, during which the vessel was gently shaken to ensure homogeneity. The resulting aromatized soluble coffee particles had 1% w/w of aromatized oil.

The aromatic soluble coffee particles (an instant coffee product wherein all of the soluble coffee particles are the aromatized soluble coffee particles) were then assessed by sensory experts and GC-MS analysis.

During sensory testing the instant coffee product had a clear roasted coffee smell. Results are summarized in Table 2

TABLE 2

| Example | Roast time (minutes) | Incubation time (days) | Atmosphere during Dosing | 2-methl pyrazine (ng/mL HS) | Smell |
|---|---|---|---|---|---|
| 2a | 5.5 | 5 | Atmosphere | 1.7 | (+) |
| 2b | 5.5 | 5 | Bean gas | 2.2 | (+) |

Example 5

Refined coffee oil was sprayed with a nozzle on soluble coffee particles in a double axial mixer. The final concentration of oil in soluble coffee particles was 1% w/w.

30 kilograms of freshly roasted coffee beans were filled in a vacuum chamber in separate portions of 10 kilo open vessels. 15 kilograms of oil rich soluble coffee particles were filled in the vacuum chamber in 5 kilo separate portions. Thereafter the vessel was closed and evacuated to below 50 millibar.

The coffee was allowed to degas for five days. After five days of incubation the chamber was opened and the resulting aromatized soluble coffee particles were packed under atmospheric conditions. The aromatic soluble coffee particles were then assessed by sensory experts and GC-MS analysis. The resulting soluble coffee (an instant coffee product wherein all of the soluble coffee particles are the aromatized soluble coffee particles) had 1% w/w of oil and generated a headspace with a 2-methyl pyrazine level of 1.9 ng/ml headspace. During sensory testing the instant coffee product had a clear roasted coffee smell.

Quantitative Analytical Method for 2-Methylpyrazine

2-Methylpyrazine headspace concentrations were determined by means of an indirect external calibration of the headspace concentration using a reference standard of 2-Methylpyrazine. Therefore a working solution of 1096 mg per liter 2-Methylpyrazine was obtained by dissolving 2-Methylpyrazine in pentane. This working solution was further diluted with pentane to obtain 6 calibration solutions of 7 µg/ml up to 1096 µg/ml. A calibration curve was made by liquid injection of 1 µL of the diluted working solutions on a simulated on-column PTV injector.

Subsequently, the headspace concentration of a known 2-Methylpyrazine solution was determined by dissolving 610 mg per 50 mL of the standard 2-Methylpyrazine in polyethyleenglycol. This stock solution was 10 times diluted with water and from this solution 300 µL was added to 2700 µL water into a 20 mL vial and equilibrated for 15 minutes at 30° C. The headspace concentration of the known 2-Methylpyrazine solution was determined by injecting 1 mL of the static headspace above the solution and calculating the liquid/headspace partition coefficient. From the liquid/headspace partition coefficient the concentration 2-Methylpyrazine in ng/mL headspace (HS) was calculated.

Quantification was performed with SPDE-HS-GC-FID using a Agilent VF-WAXms 30 m×0.25 mm×1 µm column. Therefore 4 grams of instant coffee were weighted into a 20 mL vial and the sample was equilibrated for 15 minutes at 30° C. The headspace of the sample was concentrated using a 2.5 mL SPDE syringe and 1 mL of the content of the syringe was desorbed on a GC-FID.

Method to Determine Oil Level

The oil levels were determined by means of a Soxhlet extraction. Therefore 5 grams of instant coffee were dissolved in 150 mL of boiling water and the obtained solution was passed over a filter with 6 g celite 545. The filter was collected and dried for 16 hours at room temperature and 1 hour in a drying stove operating at 103° Celcius.

Subsequently, the dried filter was collected in an extraction thimble from Schleicher & Schuell BioScience GmbH and 150 mL hexane was added as extraction medium. The sample was extracted and dried with a Gerhart Soxterm operating at 180° C. The dried product was weighted and the oil level was expressed in gram per 100 gram of instant coffee.

The invention claimed is:

1. A process for the preparation of an instant coffee product comprising aromatized soluble coffee particles, the process comprising (a) providing soluble coffee particles; (b) providing an odor-acceptable edible oil; (c) applying the oil on the soluble coffee particles, and wherein the oil is applied on the soluble coffee particles prior to conducting aroma transfer, and wherein the oil is subjected to aroma transfer from roast coffee beans, so as to obtain the aromatized soluble coffee particles, wherein the aromatized soluble coffee particles comprise aromatized oil, the aroma transfer being conducted for an incubation time of at least one day, wherein the temperature of the soluble coffee particles during incubation is 0° C. to 50° C., wherein the amount of the aromatized oil in the instant coffee is 0.8 wt. % to 4.5 wt. %, and wherein the aroma transfer is in an aroma-transfer environment wherein both the oil and roast coffee beans are present, and wherein the aroma-transfer environment is set up in such a way that the coffee beans and the oil cannot come into physical contact with each other.

2. The process according to claim 1, wherein the aromatized soluble coffee particles are mixed with non-aromatized soluble coffee particles in a ratio of from 15:1 to 1:1 on a weight basis, wherein the non-aromatized soluble coffee particles do not contain aromatized oil.

3. The process according to claim 2, wherein the ratio is 8:1 to 4:1.

4. The process according to claim 2, wherein the aromatized soluble coffee particles have an aromatized oil concentration prior to mixing of between 4.5 wt. % and 15 wt. %.

5. The process according to claim 1, wherein the amount of the aromatized oil on the soluble coffee particles is 0.8 wt. % to 4.5 wt. %, and wherein all of the soluble coffee particles in the instant coffee are the aromatized soluble coffee particles.

6. The process according to claim 1, wherein the roast coffee beans have a temperature of at most 50° C.

7. The process according to claim 6, wherein the temperature of the soluble coffee particles is 4° C. to 25° C.

8. The process according to claim 1, wherein the aroma transfer is conducted for an incubation time of one to six days.

9. The process according to claim 1, wherein the aroma transfer is conducted for an incubation time of three to six days.

10. The process according to claim 1, wherein the ratio of the roast coffee beans to the soluble coffee particles comprising applied oil is in a range of from 5:1 to 1:5 on a weight basis.

11. The process according to claim 10, wherein the ratio is 2:1 to 1:2.

12. The process according to claim 1, wherein the oil is a refined oil.

13. The process according to claim 1, wherein the oil is coffee oil.

14. The process according to claim 1, wherein the amount of aromatized oil in the instant coffee product is in a range of from 1 wt. % to 2.5 wt. % calculated on the weight of the soluble coffee particles.

15. The process according to claim 1, wherein the oil is applied in the form of an emulsion of the oil in water.

16. The process according to claim 15, wherein the emulsion has an oil percentage of at most 50 wt. %.

17. The process according to claim 15, wherein the amount of oil applied on the soluble coffee particles is in a range of from 1 wt. % to 3 wt.

18. The process according to claim 15, wherein the emulsion comprises of from 1 wt. % to 10 wt. % of soluble coffee particles as an emulsifier.

19. The process according to claim 1, wherein the roast coffee beans are whole beans.

20. The process according to claim 1, wherein the aroma transfer is conducted in a single vessel.

21. The process according to claim 1, wherein the aroma transfer is conducted in two separate vessels which are connected via the gas phase, optionally via a gas permeable membrane.

22. The process according to claim 21, wherein a forced convection is applied to the gas phase.

23. The process according to claim 1, wherein the aromatized soluble coffee particles are mixed with non-aromatized soluble coffee particles in a ratio of from 10:1 to 2:1 on a weight basis, wherein the non-aromatized soluble coffee particles do not contain aromatized oil.

24. The process according to claim 1, wherein the roast coffee beans have a temperature below 30° C.

25. The process according to claim 1, wherein the ratio of the roast coffee beans to the soluble coffee particles comprising applied oil is in a range of from 3:1 to 1:3 on a weight basis.

26. The process according to claim 1, wherein the oil is refined coffee oil.

27. The process according to claim 1, wherein the amount of aromatized oil in the instant coffee product is in a range of from 1 wt. % to 1.5 wt. % calculated on the weight of the soluble coffee particles.

28. The process according to claim 15, wherein the emulsion has an oil percentage of from 15 wt. % to 45 wt. %.

29. The process according to claim 15, wherein the amount of oil applied on the soluble coffee particles is in a range of from 1.25 wt. % to 2 wt. %.

30. The process according to claim 15, wherein the emulsion comprises of from 2.5 wt. % to 7.5 wt. % of soluble coffee particles as an emulsifier.

* * * * *